United States Patent
Grobman et al.

(10) Patent No.: US 10,176,061 B2
(45) Date of Patent: Jan. 8, 2019

(54) HANDLING MIGRATION IN A VIRTUALIZATION ENVIRONMENT

(71) Applicant: Nutanix, Inc., San Jose, CA (US)

(72) Inventors: Igor Grobman, San Jose, CA (US); Hexin Wang, Los Altos, CA (US); Gregory A. Smith, Oakland, CA (US)

(73) Assignee: NUTANIX, INC., San Jose, CA (US)

( * ) Notice: Subject to any disclaimer, the term of this patent is extended or adjusted under 35 U.S.C. 154(b) by 51 days.

(21) Appl. No.: 15/351,384

(22) Filed: Nov. 14, 2016

(65) Prior Publication Data

US 2018/0137019 A1 May 17, 2018

(51) Int. Cl.
*G06F 11/00* (2006.01)
*G06F 11/20* (2006.01)
*G06F 9/455* (2018.01)

(52) U.S. Cl.
CPC ........ *G06F 11/203* (2013.01); *G06F 9/45558* (2013.01); *G06F 2009/4557* (2013.01); *G06F 2201/805* (2013.01); *G06F 2201/815* (2013.01); *G06F 2201/82* (2013.01)

(58) Field of Classification Search
CPC ........ G06F 11/142; G06F 11/16; G06F 11/20; G06F 11/2002; G06F 11/2023
USPC .............................. 714/4.12, 4.11
See application file for complete search history.

(56) References Cited

U.S. PATENT DOCUMENTS

| | | | | |
|---|---|---|---|---|
| 2010/0077391 A1* | 3/2010 | Domsch | ............ | G06F 9/45541 717/174 |
| 2011/0222557 A1* | 9/2011 | Starks | .................... | H04L 47/36 370/465 |
| 2013/0318526 A1* | 11/2013 | Conrad | ............... | G06F 9/45533 718/1 |
| 2013/0339955 A1* | 12/2013 | Prawer | ................ | G06F 9/45533 718/1 |
| 2016/0124774 A1* | 5/2016 | Antony | ................. | G06F 9/5077 711/162 |
| 2016/0139943 A1* | 5/2016 | Bezbaruah | .......... | G06F 9/45558 718/1 |
| 2016/0188370 A1* | 6/2016 | Razin | ...................... | G06F 11/30 718/104 |
| 2016/0239328 A1* | 8/2016 | Kaplan | ............... | G06F 9/45558 |

* cited by examiner

*Primary Examiner* — Sarai E Butler
(74) *Attorney, Agent, or Firm* — Foley & Lardner LLP

(57) ABSTRACT

In one embodiment, a system for migrating virtual machines in a virtualization environment includes a plurality of host machines implementing the virtualization environment and a migration controller. Each of the host machines includes a hypervisor, one or more user virtual machines (UVMs) and a virtual machine controller. The system further implements a virtual disk comprising a plurality of storage devices, the virtual disk being accessible by the virtual machine controllers, which conduct I/O transactions with the virtual disk. The migration controller determines a segment size and, for each host machine, determines a number of required segments for the UVMs running on the host machine. The controller computes a number of reserved segments based on a total number of host machines and a largest one of the numbers of required segments. The reserved segments are then assigned among the plurality of host machines.

20 Claims, 5 Drawing Sheets

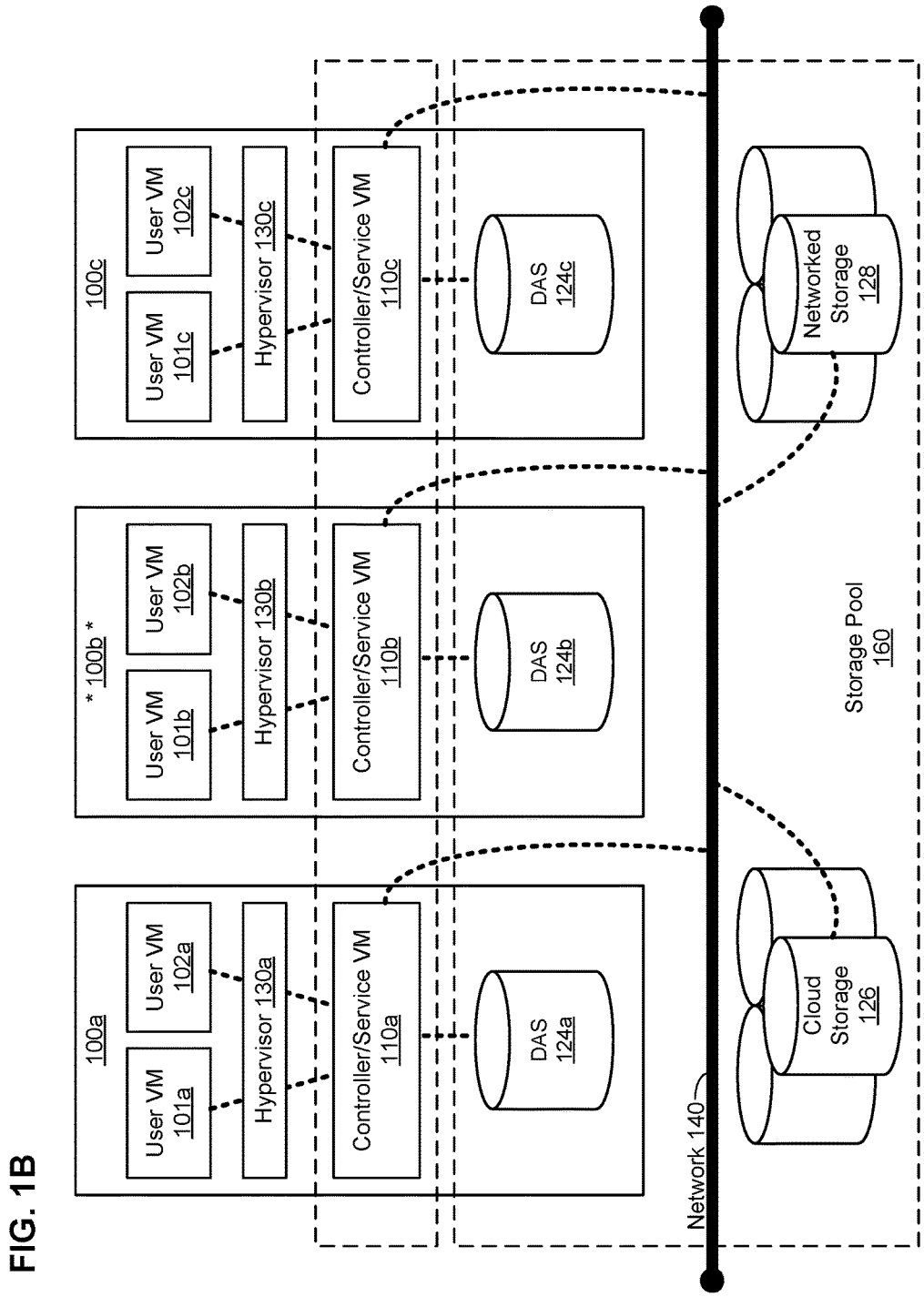

HANDLING MIGRATION IN A VIRTUALIZATION ENVIRONMENT

TECHNICAL FIELD

This disclosure generally relates to failover migration of virtual machines.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

In a clustered virtualization environment, it is sometimes desirable to provide service guarantees to VMs in case that the physical device where they are running fails. When a physical device fails, a VM running in the device may be migrated to another device with sufficient capacity to host it. In a heterogeneous environment where physical devices have variable capabilities, methods are needed to efficiently allocate reserve resources that guarantee that a VM will be successfully migrated. For example, if a large virtual machine is running on a physical device that fails, the system must find a physical device with enough capacity to host the VM.

The present invention introduces an architecture for providing successful failover migration in a heterogeneous virtualization environment. The architecture segments the computing resources available, and determines the number of segments required by the VMs running on each of the host machines. Based on these, the architecture dynamically determines a number of segments required, and an allocation of the segments among the devices, so as to guarantee that any physical device failure can be successfully migrated.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1B illustrates data flow within a clustered virtualization environment according to some embodiments of the invention.

DESCRIPTION OF EXAMPLE EMBODIMENTS

When a server or host machine fails, due to for example a hardware or software error, a virtualization environment controller may initiate a failover migration of the virtual machines that were running in the failed machine. To accomplish this, some host machines may reserve computing and memory resources that can be employed to host migrated virtual machines. Embodiments described herein dynamically determine an amount and an allocation of reserved migration space among the host machines in a virtualization environment with heterogeneous computing resources.

Figure 1A:
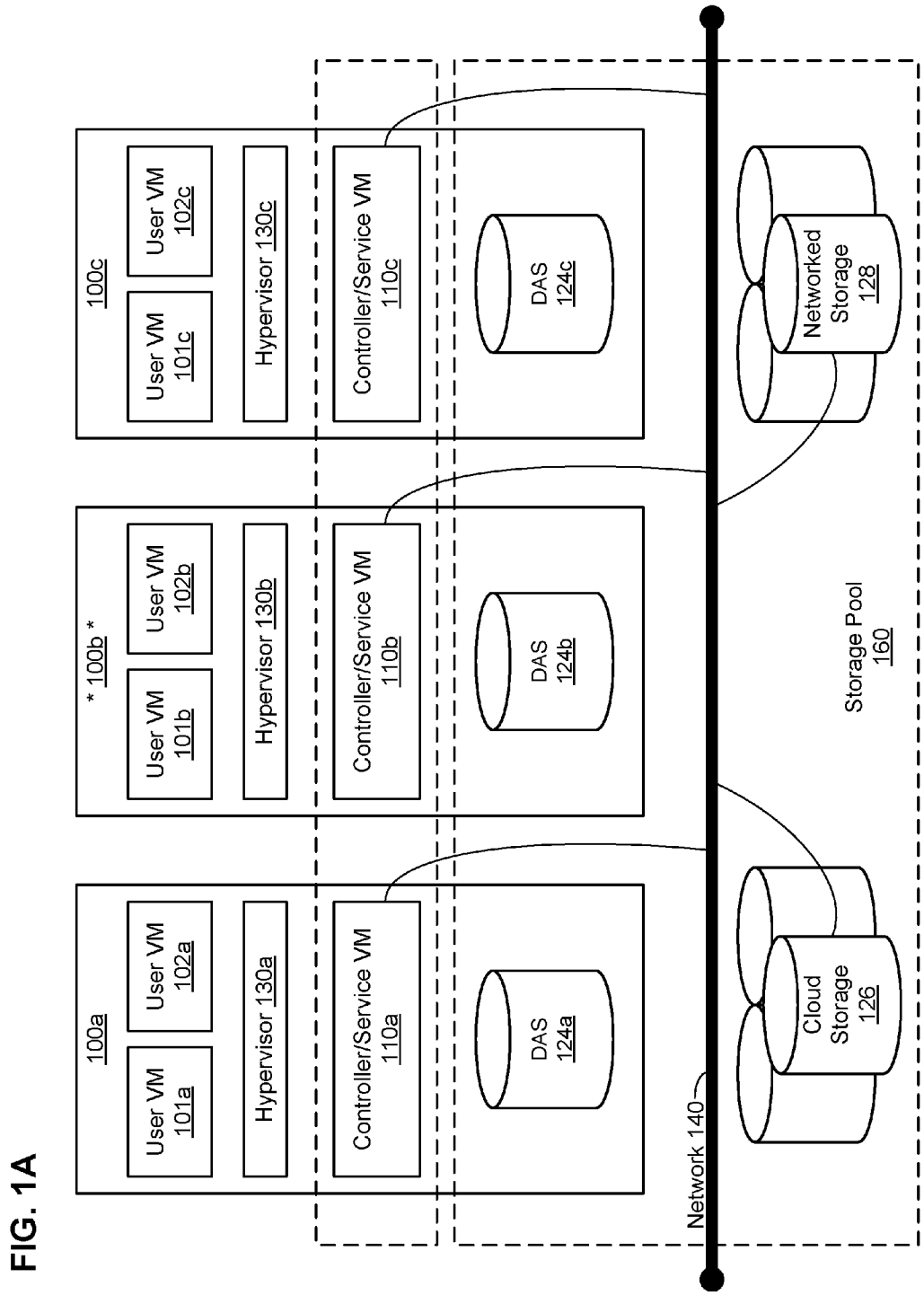
FIG. 1A illustrates a clustered virtualization environment according to some embodiments of the invention.

FIG. 1A illustrates a clustered virtualization environment according to some embodiments of the invention. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits direct-attached storage (DAS) 124a-c that is within or directly attached to the server and/or appliance to be managed as part of storage pool 160. Examples of such storage include Solid State Drives (henceforth "SSDs"), Hard Disk Drives (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

Special VMs 110a-c are used to manage storage and input/output ("I/O") activities according to some embodiment of the invention, which are referred to herein as "Controller/Service VMs". These special VMs act as the storage controller in the currently described architecture. Multiple such storage controllers coordinate within a cluster to form a single-system. Controller/Service VMs 110a-c are not formed as part of specific implementations of hypervisors 130a-c. Instead, the Controller/Service VMs run as virtual machines on the various host machines 100, and work together to form a distributed system 110 that manages all the storage resources, including DAS 124a-c, networked storage 128, and cloud storage 126. The Controller/Service VMs may connect to network 140 directly, or via a hypervisor. Since the Controller/Service VMs run independent of hypervisors 130a-c, this means that the current approach can be used and implemented within any virtual machine architecture, since the Controller/Service VMs of embodiments of the invention can be used in conjunction with any hypervisor from any virtualization vendor.

A host machine may be designated as a leader node. For example, host machine 100b, as indicated by the asterisks, may be a leader node. A leader node may have a software component designated as a leader. For example, a software component of Controller/Service VM 110b may be designated as a leader. A leader may be responsible for monitoring or handling requests from other host machines or software components on other host machines throughout the virtualized environment. If a leader fails, a new leader may be designated.

Each Controller/Service VM 110a-c exports one or more block devices or NFS server targets that appear as disks to user VMs 101a-c and 102a-c. These disks are virtual, since they are implemented by the software running inside Controller/Service VMs 110a-c. Thus, to user VMs 101a-c and 102a-c, Controller/Service VMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize DAS 124 as disclosed herein. This is because I/O performance is typically much faster when performing access to DAS 124 as compared to performing access to networked storage 128 across a network 140. This faster performance for locally attached storage 124 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

FIG. 1B illustrates data flow within an example clustered virtualization environment according to some embodiments of the invention. As described above, one or more user VMs and a Controller/Service VM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, Controller/Service VM 110a-c may present an emulated storage controller either to the hypervisor or to user VMs to facilitate I/O operations. Controller/Service 110a-c may be connected to storage within storage pool 160. Controller/Service VM 110a may have the ability to perform I/O operations using DAS 124a within the same host machine 100a, by connecting via network 140 to cloud storage 126 or networked storage 128, or by connecting via network 140 to DAS 124b-c within another node 100b-c (e.g., via connecting to another Controller/Service VM 110b-c).

Figure 2:
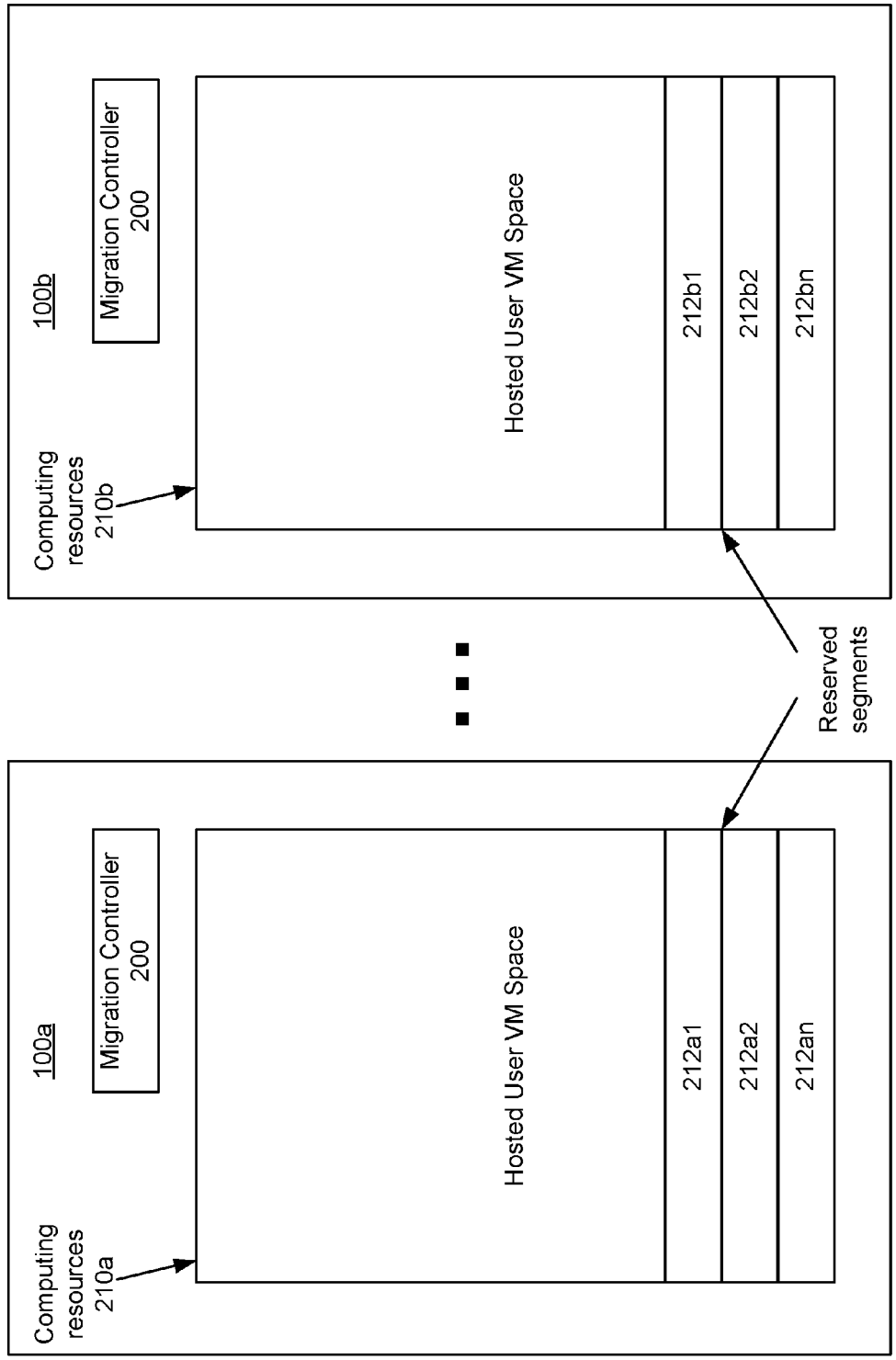
FIG. 2 illustrates an architecture of a virtualization environment including failover migration according to some embodiments of the invention.

FIG. 2 illustrates an architecture of a virtualization environment including failover migration according to some embodiments of the invention. The virtualization environment includes a migration controller 200 that determines the amount and allocation of reserved migration space. In an embodiment, these determinations are made dynamically as virtual machines and host machines are added to and removed from the system. Migration controller 200 may run on one or more of the host machines 100. For example, migration controller 200 may run as an application on Controller/Service VMs 110*a-c*, or as a separate VM running above hypervisors 130*a-c*.

Each host machine 100 may contain an amount of computing resources 210 (e.g., 210*a* on host machine 100*a* and 210*b* on host machine 100*b*) that may be different for each machine. The computing resources 210 may be, for example, CPU resources, memory, or a combination of both. Migration controller 200 may divide the available computing resources of the host machines into segments of fixed size and allocate a number of segments throughout the virtualization environment as reserved segments (212*a*1, 212*a*2, . . . , 212*an* and 212*b*1, 212*b*2, . . . , 212*bn*) for failover migrations. Each segment may be a measure of, for example, a fixed amount of CPU processing power or memory space. In an embodiment, a segment may comprise a fixed amount of computer memory. In an embodiment, remaining processing power or memory space in a host that is not part of the reserved segments can be allocated to the user VMs. This may allow for a higher availability and utilization of resources in the system.

The virtualization environment of the present embodiments may be a heterogeneous cluster of computing devices. For example, the virtualization environment may contain hosts of variable computing capabilities, and may accommodate VMs of variable sizes and computing requirements. A user VM 102 may be configured as a failover-protected VM. In an embodiment, a failover-protected VM is guaranteed to be migrated in case of a failure of its host machine. Migration controller 200 may allocate a number of reserved segments in each host based on each host's load so as to guarantee that any failover-protected VM can be successfully migrated from a failing host.

Figure 3:
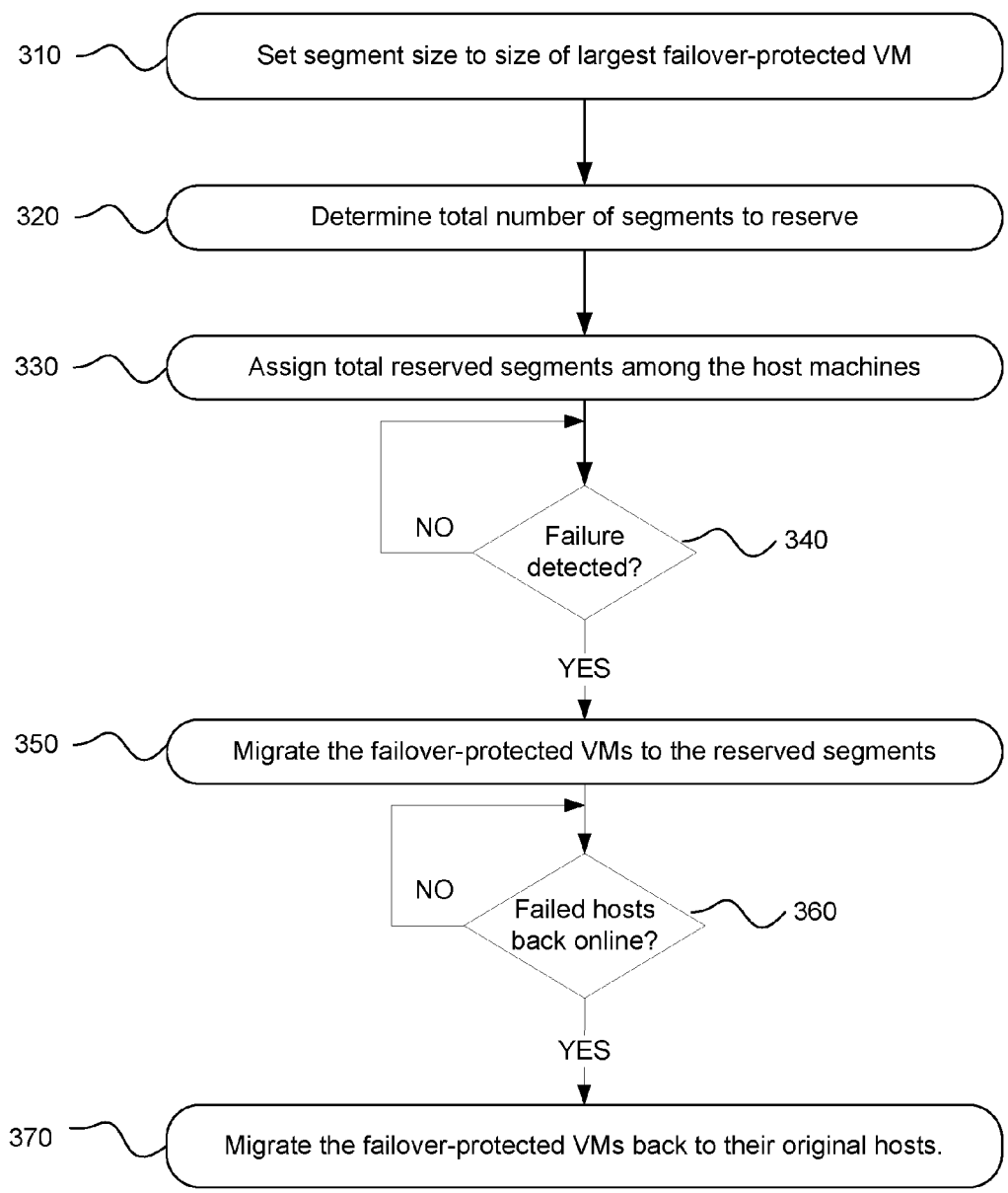
FIG. 3 illustrates an example method 300 for determining an amount and allocation of reserved failover resources, according to an embodiment.

FIG. 3 illustrates an example method 300 for determining an amount and allocation of reserved failover resources, according to some embodiments of the invention. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining an amount and allocation of reserved failover resources including the particular steps of the method of FIG. 3, this disclosure contemplates any suitable method for determining an amount and allocation of reserved failover resources including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

The method may begin at step 310, where migration controller 200 sets the segment size to correspond to the largest VM that is guaranteed to be migrated in case of failure. For example, the segment size can be the size needed to host the largest failover-protected VM.

Once a segment size is chosen, at step 320 the migration controller 200 then determines the total number of segments to reserve given the total number host failures that the virtualization environment should tolerate. In an embodiment, the migration controller 200 may be configured to tolerate one host failure, and may determine the number of segments using the formula:

$$S = \frac{n}{n-1} * \mathrm{Max}(X_i)$$

where,
S=the total number reserved segments
n=the total number of host machines
$X_i$=the number of reserved segments required for user VMs running on each host machine i, for i=1 . . . n.

The above formula reflects that the total space reserved in reserved segments may be more than the resources of the largest host machine. This may guarantee the successful failover migration of the largest VM even when memory fragmentation requires setting aside more memory than actually used by the VM.

The above formula can be derived by modeling the problem as a linear programming problem. The problem can be expressed in a linear programming canonical form:

Minimize $S = \sum_{i=1}^{n} S_i$ subject to $S - S_i >= X_i$ and $X_i >= 0, i=1 \ldots n$ (1)

where:
n represents number of hosts in the virtualization environment,
$S_i$ represents number of reserved segments assigned to host i,
S represents the total number of reserved segments calculate, and
$X_i$ represents number of reserved segments required by user VMs running on each host machine i.
By summing up formula (1):

$nS - \sum_{i=1}^{n} S_i >= \sum_{i=1}^{n} X_i$ $\Rightarrow (n-1)S >= \sum_{i=1}^{n} X_i$ (2)

The formula (2) computation can be simplified:

$\Rightarrow (n-1)S >= n*\mathrm{Max}(X_i) >= \sum_{i=1}^{n} X_i$ (3)

From (3), $$\mathrm{Minimum}\, S = \frac{n}{n-1} * \mathrm{Max}(X_i)$$

The complexity in deriving minimum S becomes O(lgN), where the main operation is to maintain a maximum heap on $X_i$.

As described above, Xi is the number of reserved segments required for user VMs on a host machine i. $X_i$ can be calculated as a multi bin packing problem to solve. The problem consists of packing user VMs that were originally on a host i into the rest of the reserved segments in the virtualization environment when host i fails, in a way that minimizes the number of reserved segments used. In computational complexity theory, it is a combinatorial NP-hard problem. It can be described as the following integer linear programming formula:

Minimize $X_i = \sum_{j=1}^{m} y_j$

Subject to $\sum_{k=1}^{m} a_k z_{jk} \le M y_j, \forall j \in \{1, \ldots, m\}$ $\sum_{j=1}^{m} z_{jk} = 1, \forall k \in \{1, \ldots, m\}$ $y_j \in \{0,1\}, \forall j \in \{1, \ldots, m\}$ $z_{jk} \in \{0,1\}, \forall j \in \{1, \ldots, m\} \forall k \in \{1, \ldots, m\}$ where: $X_i$ represents number of reserved segments for VMs on host i,
$a_k$ represents VM k size,
M represents the segment size,
m represents the number of VMs in host i,
$y_j=1$ if segment j is used,
$z_{jk}=1$ if VM k is put into segment j.

In an embodiment, rather than solving the NP-hard problem, migration controller 200 computes an approximation by picking $X_i$ to be the upper bound of reserved segments.

For each host i, upper bound of reserved segments corresponds to the worst condition where it contains the same size VMs that causes maximum fragmentation on the reserved segments.

$$\text{Max\_fragment\_per\_segment} = \text{Ceiling}\left(\frac{M}{2} - 1\right) \Rightarrow \text{VM\_size\_in\_max\_fragment} = 1 + \frac{M}{2}$$

Thus, $$\text{Worst case } X_i = \text{Ceiling}\left(\frac{N_i}{\frac{M}{2} + 1}\right) \quad (4)$$

where,
$N_i$ represents host i usage,
M represents the segment size, i.e., the maximum VM memory size in the virtualization environment, and
$X_i$ represents the maximum number of reserved segments for host i.

For example, assume M=5 Gb, $N_i$=20 Gb. The maximum fragment per segment is $$\text{Ceiling}\left(\frac{5}{2} - 1\right) = 2 \text{ Gb}.$$

This means VM size that causes max fragment=5/2+1=3. Thus the migration controller reserves 20/3=6 segments in the cluster to provide failover service guarantee on host i. In the above example, in a worst case of having 6 VMs, all having the same size 3 Gb, running on the max usage 20 Gb host, the migration controller can guarantee that all of them can be powered on when there is a failover.

The proof of upper bound Xi calculation can be expressed as follows using the First Fit Algorithm:

```
1: for All VMs k = 1, 2, ..., m do
2:     for All segments j = 1, 2, ... do
3:         if VM k fits in segment j then
4:             Pack VM k in segment j.
5:             Break the loop and pack the next VM.
6:         end if
7:     end for
8:     if VM k did not fit in any available segment then
9:         Create new segment and pack VM k.
10:    end if
11: end for.
```

To prove that upper bound $X_i$ corresponds to a host i containing a full capacity of same size VMs, where $$\text{VM\_Size} = 1 + \frac{M}{2},$$

it can be proven that all other cases of VMs in host i require segments no more than $X_i$ by using the First Fit algorithm. From the First Fit algorithm, it is impossible for 2 segments to be at most half full because such a possibility implies that at some point, exactly one segment was at most half full and a new one was opened to accommodate a VM of size at most $$\frac{M}{2}.$$

But since the first one has at least a space of $$\frac{M}{2},$$

the algorithm will not open a new segment for any item whose size is at most $$\frac{M}{2}.$$

Only after the segment fills with more than $$\frac{M}{2}$$

or if a VM with a size larger than $$\frac{M}{2}$$

arrives, the algorithm may open a new segment.

Thus, if $$X_i = \text{Ceiling}\left(\frac{N_i}{\frac{M}{2} + 1}\right)$$

segments, at least $X_i-1$ segments are more than half full.

$$\Rightarrow \left(\text{Ceiling}\left(\frac{N}{\frac{M}{2} + 1}\right) - 1\right) * \left(\frac{M}{2} + 1\right) = N - \left(\frac{M}{2} + 1\right)$$

size of VMs are packed into $X_i-1$ segments.

⇒ At most $$\frac{M}{2} + 1$$

size of VMs are left to be packed into the last segment.

Other suitable algorithms can also be used to pack all the VMs with no more than $X_i$ segments based on same property in First Fit algorithm. The Max-Rest-Priority-Queue algorithm, for example, may be used and may give a better running-time $O(n \log n)$ than First Fit, which is $O(n^2)$.

At step 330, once a number of total reserved segments is computed, migration controller 200 may assign the reserved segments among the host machines. In an embodiment, the reserved segments are assigned to each host machine according to the following condition:

$$S - S_i \geq X_i, i = 1 \ldots n$$

$$\Rightarrow S_i \leq S - X_i, i = 1 \ldots n$$

where,

S is total reserved segments in the virtualization environment, $S_i$ is the number segments allocated to host i, $X_i$ is the number segments required by VMs on host i that require a failover guarantee when a host i failure happens.

The following is an example pseudo-code that assigns $S_i$:

```
1: S' = S
2: for All nodes i = 1, 2, ..., n do
3:     S_i = min(S - X_i, S')
4:     S'-= S_i
5: end for.
```

In an embodiment, migration controller 200 may be configured to tolerate more than one host failure, and the number of segments to reserve at step 320 is determined accordingly. In the multiple host failure scenario, the number of reserved segments may be calculated using the assumption that hosts rarely fail at the same time, and rather fail one after another. Applying this assumption, the reserved segments for the second failing host are calculated based on the new virtualization environment configuration of migrated user VMs after the first host failure. This entails a calculation of $C_n^k$ combinations, where k is the number of failures to be tolerated out of n total host machines.

For example, assuming 2 as the number of failures to be tolerated, the number of reserved segments can be calculated following a similar math model to a single host failure.

Minimize $S = \Sigma_{i=1}^n S_i$ subject to $S - (S_i + S_j) \geq (X_i + X_j)$ and $X_i \geq 0, i = 1 \ldots n$ $$X_j \geq 0, j = 1 \ldots n \quad (5)$$

where, n represents number of hosts in the virtualization environment, $S_i$ represents the number of reserved segments assigned to host i, S represents total number of reserved segments to calculate, $X_i$ represents number of reserved segments required by VMs running on host i, $X_j$ represents number of reserved segments required by VMs running on host j.

By summing up formula (5) for a given i:

$$(n-1)S - \left((n-1)S_i + \sum_{j=1, j \neq i}^{n} S_j\right) \geq (n-1)X_i + \sum_{j=1, j \neq i}^{n} X_j \quad (6)$$

$$\forall i \in \{1, \ldots, n\}$$

$$\Rightarrow (n-1)S - ((n-2)S_i + S) \geq (n-2)X_i + \sum_{j=1}^{n} X_j$$

$$\Rightarrow (n-2)S - (n-2)S_i \geq (n-2)X_i + \sum_{j=1}^{n} X_j$$

By summing up formula (6) for all i:

$$\Rightarrow n(n-2)S - (n-2)\sum_{i=1}^{n} S_i \geq (n-2)\sum_{i=1}^{n} X_i + n\sum_{j=1}^{n} X_j \quad (7)$$

$$\Rightarrow (n-1)(n-2)S \geq (2n-2)\sum_{j=1}^{n} X_j$$

$$\Rightarrow \frac{n-2}{2} S \geq \sum_{j=1}^{n} X_j$$

The formula (7) computation can be further simplified:

$$\Rightarrow \frac{n-2}{2} S \geq n * \text{Max}(X_j) \geq \sum_{j=1}^{n} X_j \quad (8)$$

From (8), $$\text{Minimum } S = \frac{2n}{n-2} * \text{Max}(X_j),$$

where $X_j$ is the number of reserved segments for VMs on Node j.

For multiple host failures, the assignment of reserved segments among hosts can also be expressed as a linear programming problem to be solved. Any suitable algorithm can be used to solve the problem, for example, the Simplex Algorithm.

At steps 340 and 350, if a failure is detected, the failover-protected user VMs are migrated to the reserved segments. In an embodiment, the failover-protected VMs each have a priority, and are restarted in the reserved segments in order of priority. In an embodiment, the VMs are migrated in order of size. In yet another embodiment, the VMs are migrated in order of priority, and an order of size within a group of VMs that have the same priority.

At step 360, when a failure occurs and VMs are migrated, the virtualized environmental system enters a healing period, where any further failures may not be protected (if the number of current failures is equal to the maximum tolerated failures). To bring the system back to a protected state, migration controller 200 may migrate the VMs back to their original host when the hosts are restored, as shown in step 370.

A situation may arise with the described embodiments where a user of the virtualization environment system may need additional computing resources that have been taken by reserved failover segments. For example, a user may need to create additional user VMs, but may not be any available computing resources to do so. In an embodiment, migration controller 200 may provide a user with information regarding the resources being taken by the user VMs. For example, the information can include a list of user VMs that indicates which of them are failover-protected VMs and how many resources each VM is taking. This information may be used, for example, to create a user interface that allows the user to power off certain VMs, or change their failover-protection state to free up reserved failover segments.

Figure 4:
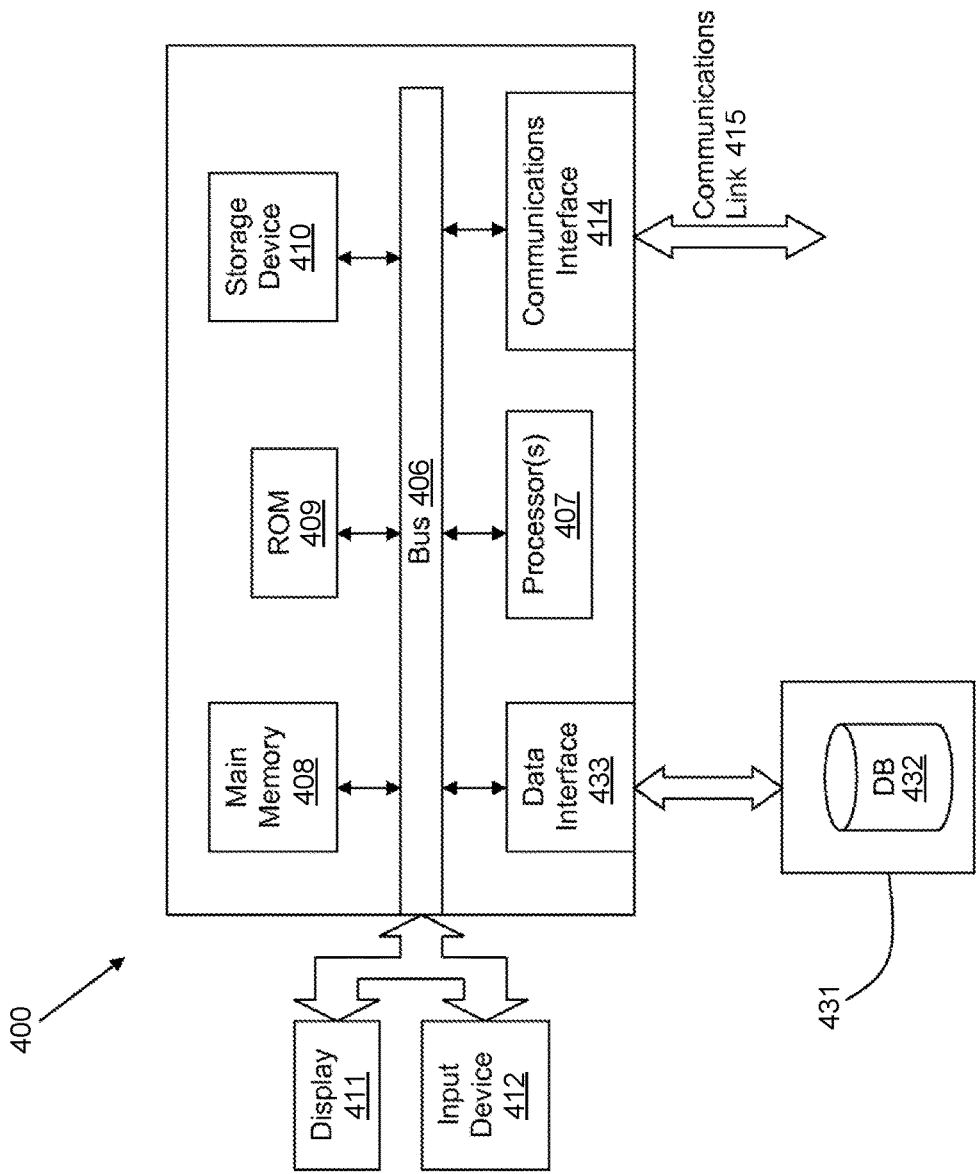
FIG. 4 illustrates a block diagram of a computing system suitable for implementing an embodiment of the present invention.

FIG. 4 is a block diagram of an illustrative computing system 400 suitable for implementing an embodiment of the present invention. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (MC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to one embodiment of the invention, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 407 for execution. Such a medium may take many forms, including but not limited to, nonvolatile media and volatile media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. A database 432 in a storage medium 431 may be used to store data accessible by the system 400 by way of data interface 433.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for migrating virtual machines in a virtualization environment, the system comprising:
 a plurality of host machines implementing the virtualization environment, wherein each of the host machines comprises a hypervisor, one or more virtual machines (UVMs) and a virtual machine controller;
 a virtual disk comprising a plurality of storage devices, the virtual disk being accessible by the virtual machine controllers, wherein the virtual machine controllers conduct I/O transactions with the virtual disk; and
 a migration controller configured to:
  determine a segment size of a computing resource;
  for each host machine, determine a number of reserved segments required for the one or more UVMs running on the host machine; and
  compute a total number of reserved segments based on:
   a total number of host machines, and
   a maximum number of the reserved segments required for the one or more UVMS; and
  assign the total number of reserved segments among the plurality of host machines.

2. The system of claim 1, wherein the migration controller is further configured to:
 upon detecting a failure of a first host machine of the plurality of host machines, migrate at least one of the one or more UVMs on the first host machine to a second host machine,
 wherein the second host machine has enough of the reserved segments to host the at least one of the one or more UVMs.

3. The system of claim 1, wherein the computing resource comprises a capability of processing power and memory.

4. The system of claim 1, wherein the total number of reserved segments is computed using the formula:

$$S = \frac{n}{n-1} * \text{Max}(X_i)$$

where,
S=the number of reserved segments
n=the total number of host machines
$X_i$=the number of reserved segments required for the one or more UVMs running on each of the plurality of host machines i, for i=1 . . . n.

5. The system of claim 1, wherein the assigning of the total number of reserved segments among the plurality of host machines is based on the number of reserved segments required for the one or more UVMs running on each of the plurality of host machines.

6. The system of claim 1, wherein the total number of reserved segments is computed using the formula:

$$S = \frac{2n}{n-2} * \text{Max}(X_j)$$

S=the number of reserved segments
n=the total number of host machines
$X_j$=the number of reserved segments required for the one or more UVMs running on each of the plurality of host machines j, for j=1 . . . n.

7. The system of claim 1, wherein the migration controller is further configured to provide information regarding the total number of reserved segments and the reserved segments required for the one or more UVMs for presentation to a user in a user interface.

8. The system of claim 7, wherein the user interface allows the user to power off at least one of the one or more UVMs or remove a failover protection of at least one of a failover-protected UVMs.

9. One or more computer-readable non-transitory storage media embodying software for managing communication connections in a virtualization environment, the media comprising instructions operable when executed to:
 implement the virtualization environment in a plurality of host machines, wherein each of the host machines comprises a hypervisor, one or more user virtual machines (UVMs) and a virtual machine controller;
 implement a virtual disk comprising a plurality of storage devices, the virtual disk being accessible by the virtual machine controllers, wherein the virtual machine controllers conduct I/O transactions with the virtual disk;
 determine a segment size of a computing resource;
 for each host machine, determine a number of reserved segments required for the one or more UVMs running on the host machine;
 compute a total number of reserved segments based on:
  a total number of host machines, and
  a maximum number of the reserved segments required for the one or more UVMS; and
 assign the total number of reserved segments among the plurality of host machines.

10. The media of claim 9, wherein the software is further operable when executed to:
 upon detecting a failure of a first host machine of the plurality of host machines, migrate at least one of the one or more UVMs on the first host machine to a second host machine,
 wherein the second host machine has enough of the reserved segments to host the at least one of the one or more UVMs.

11. The media of claim 9, wherein the computing resource comprises a capability of processing power and memory.

12. The media of claim 9, wherein the reserved segments required for the one or more UVMs comprise a number of segments that are required to host one or more failover-protected UVMs of the one or more UVMs.

13. The media of claim 9, wherein the total number of reserved segments is computed using the formula:

$$S = \frac{n}{n-1} * \text{Max}(X_i)$$

where,

S=the number of reserved segments n=the total number of host machines $X_i$=the number of reserved segments required for the one or more UVMs running on each of the plurality of host machines i, for i=1 . . . n.

14. The media of claim 12, wherein the reserved segments required for the one or more UVMs running on each of the plurality of host machines is determined by computing an upper bound corresponding to a UVM size that causes a maximum fragmentation of the reserved segments.

15. The media of claim 9, wherein the assigning of the total number of reserved segments among the plurality of host machines is based on the reserved segments required for the one or more UVMs running on each of the plurality of host machines.

16. The media of claim 9, wherein the total number of reserved segments is computed using the formula:

$$S = \frac{2n}{n-2} * \text{Max}(X_j)$$

S=the number of reserved segments n=the total number of host machines $X_j$=the number of reserved segments required for the one or more UVMs running on each of the plurality of host machines j, for j=1 . . . n.

17. The media of claim 12, wherein the software is further operable when executed to provide information regarding the total number of reserved segments and the reserved segments required for the one or more UVMs for presentation to a user in a user interface.

18. The media of claim 17, wherein the user interface allows the user to power off at least one of the one or more UVMs or remove a failover protection of at least one of the failover-protected UVMs.

19. A system comprising:
a plurality of host machines in a virtualization environment, each of the plurality of host machines comprising one or more user virtual machines; and
a migration controller configured to:
determine a segment size of a computing resource; and
determine a total number of reserved segments on the plurality of host machines to allow for migration of a failed user virtual machine from an underlying host machine to another host machine, wherein the total number of reserved segments are computed based upon:
a total number of the plurality of host machines; and
a maximum number of reserved segments required by any one of the plurality of host machines.

20. The system of claim 19, wherein the segment size is based upon a size of the computing resource of the failed user virtual machine.

* * * * *